United States Patent
Nishii et al.

[11] Patent Number: 5,899,068
[45] Date of Patent: * May 4, 1999

[54] HYDRAULIC BRAKE APPARATUS FOR A VEHICLE

[75] Inventors: Michiharu Nishii, Toyota; Takashi Kurokawa, Nagoya; Masahiko Kato, Toyoake, all of Japan

[73] Assignees: Aisin Seiki Kabushiki Kaisha, Kariya; Toyota Jidosha Kabushiki Kaisha, Toyota, both of Japan

[ * ] Notice: This patent is subject to a terminal disclaimer.

[21] Appl. No.: 08/866,296

[22] Filed: May 30, 1997

[30] Foreign Application Priority Data

May 31, 1996 [JP] Japan ................................ 8-161020

[51] Int. Cl.$^6$ .................................................. B60T 11/20
[52] U.S. Cl. ................................ 60/562; 60/585; 60/591; 60/592
[58] Field of Search ................................ 60/533, 547.1, 60/562, 585, 591, 592

[56] References Cited

U.S. PATENT DOCUMENTS

| | | | |
|---|---|---|---|
| 3,928,970 | 12/1975 | Farr | 60/562 |
| 4,876,853 | 10/1989 | Shirai et al. | 60/562 X |
| 4,986,613 | 1/1991 | Nishii et al. | . |
| 5,515,678 | 5/1996 | Kurokawa et al. | 60/591 |

FOREIGN PATENT DOCUMENTS

| | | |
|---|---|---|
| 58-24300 | 5/1983 | Japan . |
| 2-41965 | 2/1990 | Japan . |
| 2-92765 | 4/1990 | Japan . |

*Primary Examiner*—Hoang Nguyen
*Attorney, Agent, or Firm*—Burns, Doane, Swecker & Mathis, L.L.P.

[57] ABSTRACT

The invention is directed to a hydraulic brake apparatus which includes a master cylinder having a cylinder body and a master piston slidably disposed therein for defining a pressure chamber ahead of the master piston and a power chamber behind the master piston. The master piston includes a first piston connected to a brake pedal and a second piston slidably disposed relative to the first piston. The rear ends of the first piston and second piston are exposed to the power chamber, and the front ends of the first piston and second piston are exposed to the pressure chamber. An engaging member is provided for engaging the second piston with the first piston upon forward movement of the second piston. A control piston is slidably disposed in the cylinder body ahead of the master piston to define the pressure chamber behind the control piston. An auxiliary pressure source is provided for pressurizing brake fluid to generate a power pressure, and a valve assembly is communicated with the auxiliary pressure source to regulate the power pressure into a regulated pressure in response to movement of the control piston. The valve assembly is adapted to supply the regulated pressure into the power chamber to assist the operation of the manually operated member.

13 Claims, 4 Drawing Sheets

HYDRAULIC BRAKE APPARATUS FOR A VEHICLE

BACKGROUND OF THE INVENTION

1. FIELD OF THE INVENTION

The present invention relates to a hydraulic brake apparatus for a vehicle, and more particularly to the apparatus having an auxiliary pressure source for generating a power pressure and a valve assembly for regulating the power pressure into a regulated pressure.

2. DESCRIPTION OF THE RELATED ARTS

As for the hydraulic brake apparatus having the auxiliary pressure source and the valve assembly, the U.S. Pat. No. 4,986,613 (corresponding to Japanese Patent Laid-open Publication No.2-41965) discloses a hydraulic braking system having an auxiliary cylinder which increases a hydraulic brake pressure from a master cylinder without causing any excessive braking force applied to wheel brake cylinders. In this system, the auxiliary cylinder is adapted to increase a hydraulic brake pressure applied to the wheel brake cylinders, when one of a hydraulic power pressure generated by the power source and a hydraulic pressure generated by a hydraulic booster is less than the hydraulic brake pressure by a predetermined difference. The auxiliary cylinder is allowed to be in its operative condition only when one of the hydraulic pressures generated by the power source, the hydraulic booster and the master cylinder is less than a predetermined value.

According to the above hydraulic braking system, the auxiliary cylinder is arranged in parallel with, but separated from the master cylinder and the hydraulic booster which are combined to be integral. Therefore, the system as a whole will be large in scale, and piping of hydraulic pressure circuits will be complicated to cause a difficulty in designing the system, which will be a great bar when minimizing the system, and which will raise its manufacturing cost.

SUMMARY OF THE INVENTION

Accordingly, it is an object of the present invention to provide a hydraulic brake apparatus for a vehicle having a master cylinder, an auxiliary pressure source for generating a power pressure and a valve assembly for regulating the power pressure into a regulated pressure, which is adapted to assist the master cylinder by the regulated pressure fed from the valve assembly in response to operation of a manually operated member, when the pressure supplied from the auxiliary pressure source is sufficient, and directly operate the master cylinder in response to operation of the manually operated member when the pressure supplied from the auxiliary pressure source is insufficient.

It is another object of the present invention to provide the hydraulic brake apparatus which is small in size, and which can be manufactured at a low cost.

In accomplishing the above and other objects, a hydraulic brake apparatus for a vehicle includes a master cylinder having a cylinder body and a master piston slidably disposed therein for defining a pressure chamber ahead of the master piston and a power chamber behind the master piston. The master piston is adapted to be moved forward in response to operation of a manually operated member to generate a brake pressure from the pressure chamber. The master piston includes a first piston connected to a manually operated member and a second piston slidably disposed relative to the first piston. The rear ends of the first piston and second piston are exposed to the power chamber, and the front ends of the first piston and second piston are exposed to the pressure chamber. An engaging member is provided for engaging the second piston with the first piston upon forward movement of the second piston. A control piston is slidably disposed in the cylinder body ahead of the master piston to define the pressure chamber behind the control piston, so that the control piston is movable in response to movement of the master piston. An auxiliary pressure source is provided for pressurizing brake fluid to generate a power pressure, and a valve assembly is communicated with the auxiliary pressure source, and adapted to regulate the power pressure into a regulated pressure in response to movement of the control piston. The valve assembly is adapted to supply the regulated pressure into the power chamber to assist the operation of the manually operated member.

In the above-described apparatus, the engaging member may include a shoulder portion which is formed on the first piston, and which is adapted to abut on the second piston upon forward movement of the second piston.

Preferably, the second piston is formed with a cylindrical member having the rear end thereof exposed to the power chamber and having the front end thereof exposed to the pressure chamber, and preferably the first piston is slidably received in the cylindrical member with a closed space defined between the first piston and the cylindrical member, and preferably a passage is provided for communicating the closed space with the pressure chamber. In stead, the passage may be provided for communicating the closed space with the power chamber.

The throttle device may be disposed in the passage for restricting a flow passage area of the passage. The variable throttle device may be disposed in the passage for varying a flow passage area of the passage in response to the pressure in the power chamber. The variable throttle device may be provided for varying the flow passage area of the passage in response to a position of the second piston. Or, the variable throttle device may be provided for varying the flow passage area of the passage in response to a difference in pressure between the pressure chamber and the power chamber.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
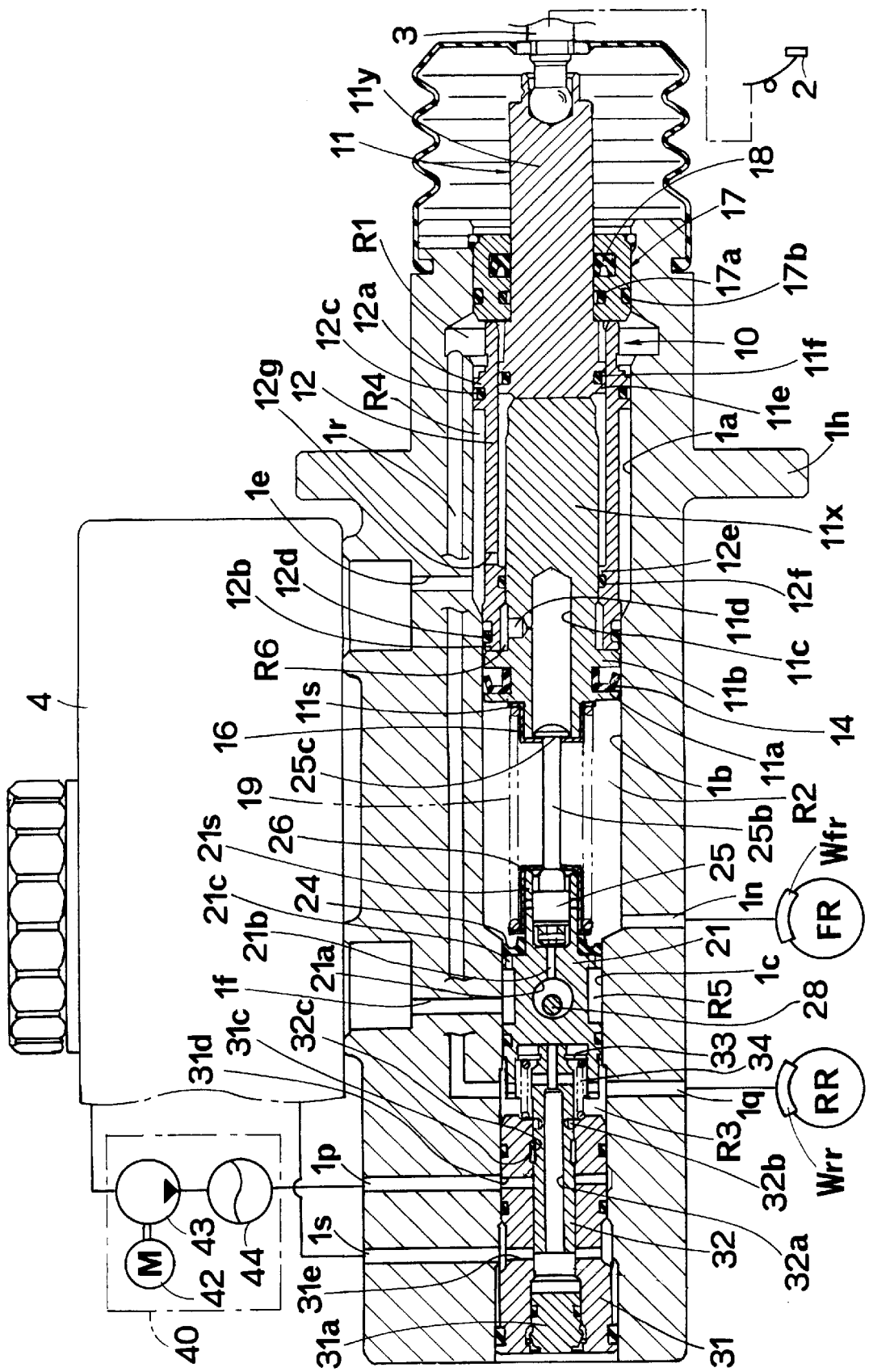
FIG. 1 is a sectional view of a hydraulic brake apparatus for a vehicle according to an embodiment of the present invention.

Referring to FIG. 1, there is illustrated a hydraulic brake apparatus for a vehicle, which includes a cylinder body 1h provided with a master cylinder section and a regulator section, and which includes a brake pedal 2 which is disposed behind the cylinder body 1h (the right in FIG. 1) as a manually operated member according to the present invention. A depressing force applied on the brake pedal 2 is transmitted as a braking force to the master cylinder section and the regulator section through a push rod 3. In response to the depressing force, a hydraulic pressure is generated in the master cylinder section and the regulator section, and applied to wheel cylinders Wfr, Wfl, Wrr, Wrl which are operatively mounted on front wheels FR, FL and rear wheels RR, RL of the a vehicle. In FIG. 1, there are disclosed only the wheels FR, RR which are located at the front right and rear right of the vehicle, and the wheel cylinders Wfr, Wrr which are operatively mounted on the wheels FR, RR.

In the cylinder body 1h, there is formed a stepped bore which includes bores 1a, 1b, 1c having different diameters from one another, and in which a master piston 10 and a control piston 21 are received to define therebetween a pressure chamber R2. The bore 1a is communicated with a power chamber R1 having a larger diameter than that of the bore 1a. The control piston 21 is fluid-tightly and slidably received in the bore 1c having the smallest diameter.

The master piston 10 has a first piston 11 which is divided into two pistons 11x, 11y, and a second piston 12 which is formed with a cylindrical member. On the inner periphery of the second piston 12 is formed a land portion 12e on which a sealing member 12f is disposed. On the outer periphery of the second piston 12 is formed a land portion 12a of a relatively large diameter and a land portion 12b of a relatively small diameter which is away from the land portion 12a by a certain distance. The piston 12 is received in the bores 1a and 1b, with a sealing member 12c disposed on the land portion 12a and fluid-tightly and slidably received in the bore 1a, and with a sealing member 12d disposed on the land portion 12b and fluid-tightly and slidably received in the bore 1b, so that a fluid chamber R4 is defined between the land portions 12a and 12b in the bores 1a and 1b. The fluid chamber R4 is communicated with a reservoir 4 through a port 1e. A passage 12g is formed on the second piston 12 behind the land portion 12e.

The piston 11x of the first piston 11 has a land portion 11a and a shoulder portion 11b, which are formed at the front end portion of the piston 11x, and fitted into the bore 1b. Between the land portion 11a and shoulder portion 11b, an annular cup-like sealing member 14 is received. The rear portion of the piston 11x is received in the second piston 12. The piston 11x is formed with an axial recess 11c which is communicated with the pressure chamber R2, and a throttle passage 11d through which the recess 11c is communicated with a space behind the shoulder portion 11b in the bore 1b. Thus, a closed space R6, which is defined in the bore 1b between the sealing member 14 disposed on the piston 11x and the sealing members 12d, 12f disposed on the second piston 12, is communicated with the pressure chamber R2 through the throttle passage 11d and the recess 11c. The sealing member 14 is provided for only allowing the brake fluid to be fed from the pressure chamber R2 into the closed space R6 when the first piston 11 is moved away from the second piston 12 to expand the closed space R6.

The piston 11y is received in the second piston 12 at the rear end thereof. The piston 11y has a land portion 11e which is formed around its outer periphery at its front end portion, and which is provided with an annular sealing member 11f, and the piston 11y is fluid-tightly and slidably received in the inside of the second piston 12, so that the front end face of the piston 11y abuts on the rear end face of the piston 11x.

The piston 11y is supported at its middle portion by a cylindrical sleeve 17. On the inner periphery and outer periphery of the sleeve 17, circumferential grooves are formed to receive therein sealing members 17a, 17b, and on the inner periphery of the sleeve 17 axially remote from the sealing members 17a, 17b, a circumferential groove is formed to receive therein a sealing member 18 thereby to seal the power chamber R1 effectively.

At the front portion of the cylinder body 1h, there is formed the regulator section which is connected to an auxiliary pressure source 40 for supplying a power pressure therefrom. The auxiliary pressure source 40 includes an electric motor 42 and a fluid pump 43 driven by the motor 42, and its inlet is connected to the reservoir 4 and its outlet is connected to an accumulator 44 through which the power pressure is supplied to a passage 31d via a port 1p. The control piston 21 has a pair of land portions formed around its outer periphery with a certain distance apart axially therebetween, and received in the bore 1c, whereby a fluid chamber R5 is defined between the land portions.

As shown in FIG. 1, the control piston 21 has a through hole 21a formed radially and an axial passage 21b communicated with the through hole 21a, so that one end of the passage 21b is communicated with the fluid chamber R5 and the other end is communicated with the pressure chamber R2. The fluid chamber R5 is communicated with the reservoir 4 through a port 1f. At the rear land portion of the control piston 21, an axial passage 21c is formed. An annular sealing member 24 is disposed at an end of the passage 21c opening to the pressure chamber R2, so that a one-way valve is formed. The pressure chamber R2 is, therefore, defined between the sealing member 24 and the sealing member 14 which is disposed on the land portion 11a of the first piston 11.

The control piston 21 has a cylindrical support portion 21s integral therewith to enclose the passage 21b, and a valve member 25 is slidably disposed in the support portion 21s. One end of the valve member 25 is covered by a resilient material such as rubber which can abut on the passage 21b to close the same. At the other end of the valve member 25, a rod 25b is formed to be integral with the valve member 25, and an engaging portion 25c is formed at the rear end of the rod 25b. A retainer 26 is mounted on the support portion 21s to restrain the valve member 25 from moving toward the piston 11x. Likewise, the piston 11x has a cylindrical support portion 11s formed at the side of the land portion 11a to enclose the recess 11c. A retainer 16 is mounted on the support portion 11s, and engaged with the engaging portion 25c to restrain the valve member 25 from moving toward the control piston 21. At the axial end of the control piston 21 opposite to the retainer 26, is formed a recess in which an end portion of a spool 32 is held as described later. The through hole 21a receives therein an engaging pin 28 which is fixed to the cylinder body 1h, so that the control piston 21 is allowed to move forward, but restrained from moving backward (i.e., restrained from moving toward the first piston 11).

A cylindrical sleeve 31 is received in the stepped bore 1c which is communicated with the bore 1b. The sleeve 31 has a plurality of circumferential grooves formed around its periphery, and annular sealing members are received in the grooves, respectively. Between the neighboring sealing members are formed radial passages 31d, 31e to communicate the ports 1p, is with the inside of the sleeve 31, in which the spool 32 is slidably received, and the front end of which is closed by a plug 31a.

In the spool 32, are formed an axial passage 32a and a radial throttle passage 32b communicated with the passage 32a. One end of the spool 32 is placed in a regulator chamber R3 and engaged with the control piston 21. A retainer 33 is disposed in the recess of the control piston 21, and a spring 34 is mounted between the sleeve 31 and the retainer 33 to urge the spool 32 to abut on the control piston 21. The axial passage 32a is so arranged that its open end normally opens in the regulator chamber R3 at the junction of the spool 32 and the control piston 21. When the control piston 21 is placed in its initial position, the other end of the passage 32a of the spool 32 is arranged to be communicated with the reservoir 4 through the passage 31e and the port is, so that the regulator chamber R3 is communicated with the reservoir 4 to be filled with the brake fluid under the atmospheric pressure.

The passage 31d is formed in the sleeve 31 so as to be communicated with the auxiliary pressure source 40 through the port 1p, while it has been closed by the spool 32 as shown in FIG. 1. A circumferential groove 31c is formed on the inner periphery of the sleeve 31 with a certain distance away from the passage 31d, and a circumferential groove 32c is formed on the outer periphery of the spool 32 to face the groove 31c. Accordingly, when the spool 32 is placed at its position as shown in FIG. 1, the regulator chamber R3 is communicated with the reservoir 4 through the passage 32a of the spool 32, the passage 31e of the sleeve 31 and the port is to be under the atmospheric pressure. When the spool 32 is moved toward the plug 31a in response to movement of the control piston 21, the groove 31e of the sleeve 31 is shut off, and in turn the passage 31d of the sleeve 31 faces the groove 32c of the spool 32 and at the same time the groove 31c faces the throttle passage 32b, so that the regulator chamber R3 is communicated with the passage 32a. Consequently, the power pressure is supplied from the auxiliary pressure source 40 into the regulator chamber R3 to increase the pressure therein. The regulator chamber R3 is communicated with the power chamber R1 through a port 1r formed in the cylinder body 1h.

In operation, when the brake pedal 2 is depressed to push the first piston 11 forward (to the left in FIG. 1) through the push rod 3, the valve member 25 abuts on the control piston 21 to shut off the passage 21b by the resilient member of the valve member 25, so that the communication between the pressure chamber R2 and the reservoir 4 is blocked to be in a closed state. In this state, since the master piston 10 and the control piston 21 are held to be in the condition as shown in FIG. 1 through a spring 19, they move together as one body. Then, the spool 32 engaged with the control piston 21 will shut off the passage 31e to block the communication between the reservoir 4 and the regulator chamber R3. At the same time, the power pressure is supplied from the auxiliary pressure source 40 into the regulator chamber R3 through the port 1p, passage 31d, grooves 31c, 32c, and throttle passage 32b, thereby to be fed into the wheel cylinder Wrr through a port 1q as a regulated pressure, and also fed into the power chamber R1 through the port 1r. Whereby, the front end of the second piston 12 is pressed onto the shoulder portion 11b, and the first and second pistons 11, 12 are moved forward, so that the pressure chamber R2 is compressed to generate the master cylinder pressure from a port 1n. In this case, the movement of the first piston 11 is assisted by the regulated pressure supplied in response to depression of the brake pedal 2, because the sealing diameter of the second piston 12 is larger than the sealing diameter of the first piston 11.

During this operation, if the regulated pressure becomes greater than the master cylinder pressure, the control piston 21 is actuated to move away from the sleeve 31, so that the passage 32a of the spool 32 is communicated with the reservoir 4, thereby to decrease the pressure in the regulator chamber R3. Whereas, if the regulated pressure becomes smaller than the master cylinder pressure, the passage 31e is shut off, and in turn the power pressure is introduced from the auxiliary pressure source 40 through the passage 31d into the regulator chamber R3 to increase the pressure therein. Thus, the pressure in the regulator chamber R3 is regulated by repetition of the movement of the control piston 21 as described above and the movement of the spool 32 activated in accordance with the movement of the control piston 21.

With respect to the operation of the master piston 10, when the pistons 11x and 11y are moved toward the control piston 21 in response to operation of the brake pedal 2, it will take a certain time until the regulated pressure is supplied to the power pressure R1 to move the second piston 12, so that the shoulder portion 11b of the piston 11x will be moved away from the end face of the second piston 12 to expand the closed space R6. Whereby, a part of the brake fluid in the pressure chamber R2 will be fed into the closed space R6 through the sealing member 14 having the one-way valve function. In this condition, if the regulated pressure is fed into the power chamber R1 to move the second piston 12, the brake fluid in the closed space R6 will be gradually discharged from the throttle passage 11d and the recess 11c, so that a damping effect will be caused to decrease the shock.

Figure 2:
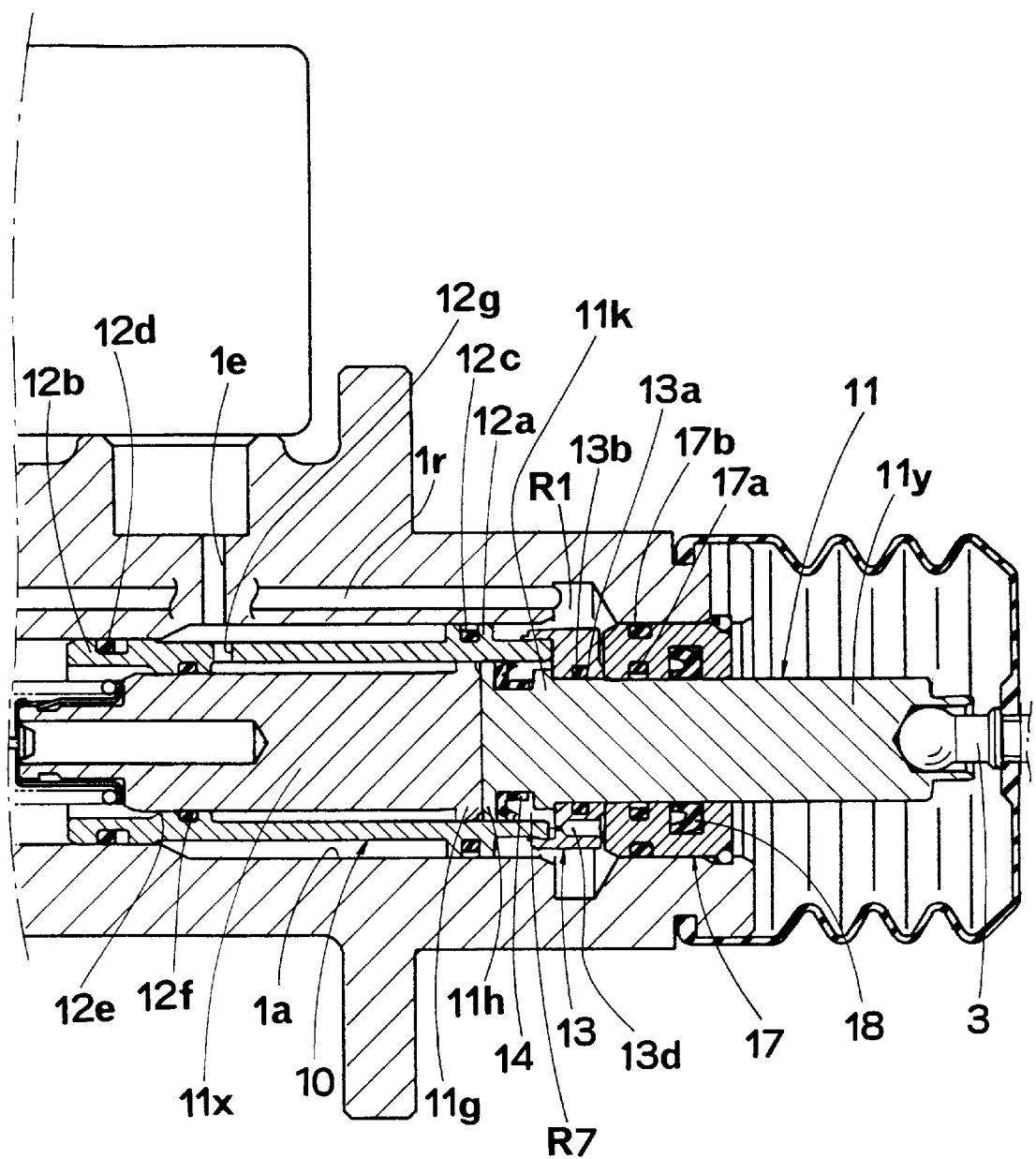
FIG. 2 is a sectional view of a part of a hydraulic brake apparatus for a vehicle according to another embodiment of the present invention.

FIG. 2 illustrates a part of another embodiment of the hydraulic brake apparatus according to the present invention. The master piston 10 is different in structure from that as shown in FIG. 1, but the rest of the components are the same as those as shown in FIG. 1, so that they are omitted in FIG. 2. According to the present embodiment, the piston 11x of the first piston 11 has a land portion 11g formed at is rear end portion, and is supported at its front end portion by the land portion 12e formed on the inner periphery of the second piston 12. In this embodiment, the piston 11x is not provided with any sealing members. On the other hand, the piston 11y is formed at its front end portion with a land portion 11h and a shoulder portion 11k, between which the sealing member 14 is received. An annular holding member 13 is secured to the rear end of the second piston 12. On the inner periphery of the holding member 13, a groove 13a is formed to receive therein a sealing member 13b, and the shoulder portion 11k can be engaged with the holding member 13. Accordingly, a closed space R7 is defined in the second piston 12 between the sealing member 14 on the piston 11y and the sealing member 13b on the holding member 13. And, the closed space R7 is communicated with the power chamber R1 through a throttle passage 13d. In this embodiment, the sealing member 14 is provided only for allowing the brake fluid to be fed from the port 12g which is communicated with the reservoir 4 to the closed space R7, when the first piston 11 is moved away from the second piston 12 to expand the closed space R7.

According to the present embodiment, when the pistons 11x and 11y are moved toward the control piston 21 in response to operation of the brake pedal 2, the shoulder portion 11k of the piston 11x will be moved away from the end face of the second piston 12 to expand the closed space R7. Whereby, a part of the brake fluid will be fed from the reservoir 4 into the closed space R7 through the sealing member 14 having the one-way valve function. In this condition, if the regulated pressure is fed into the power chamber R1 to move the second piston 12, the brake fluid in the closed space R7 will be gradually discharged into the power chamber R1 through the throttle passage 13d, so that the damping effect will be caused to decrease the shock.

Figure 3:
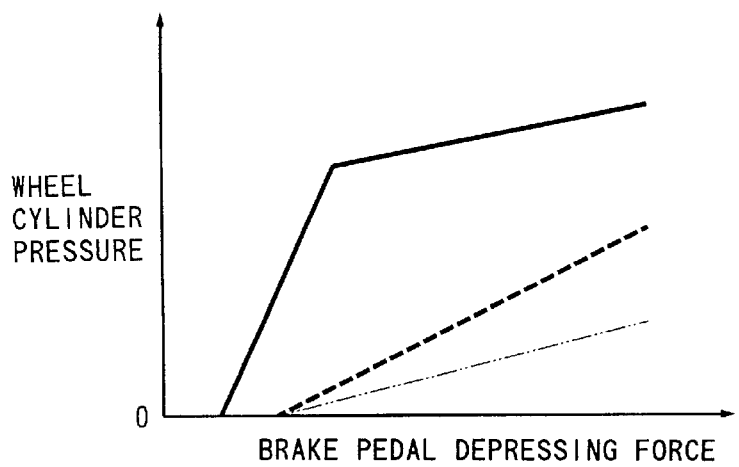
FIG. 3 is a diagram showing a brake pressure characteristic of the hydraulic brake apparatuses according to the above embodiments of the present invention.

FIG. 3 shows a relationship between the depressing force applied to the brake pedal 2 and the wheel cylinder pressure according to the above-described embodiments, wherein a solid line indicates a characteristic of the embodiments in the normal condition, a broken line indicates a characteristic in case of a loss of the power pressure, and a two-dotted chain line indicates a characteristic of a model without the second piston 12. Comparing the broken line with the two-dotted chain line, it will be understood that the wheel cylinder pressure is increased when the power pressure is lost according to the embodiments as indicated by the broken line, as explained hereinafter. In such a case where the master cylinder is not provided with the second piston 12, but provided with only a large diameter piston for boosting, the cross sectional area of the piston is made relatively large, so that the wheel cylinder pressure, i.e., the pressure in the pressure chamber R2, will be relatively small when a certain depressing force is applied to the brake pedal as indicated by the two-dotted chain line. Whereas, according to the embodiments, only the first piston 11 with the small diameter is operated in case of the loss of the power pressure, so that the cross sectional area of the piston is relatively small. In case of the loss of the power pressure, therefore, the pressure in the pressure chamber R2 will be relatively large when the certain depressing force is applied to the brake pedal, as indicated by the broken line.

Figure 4:
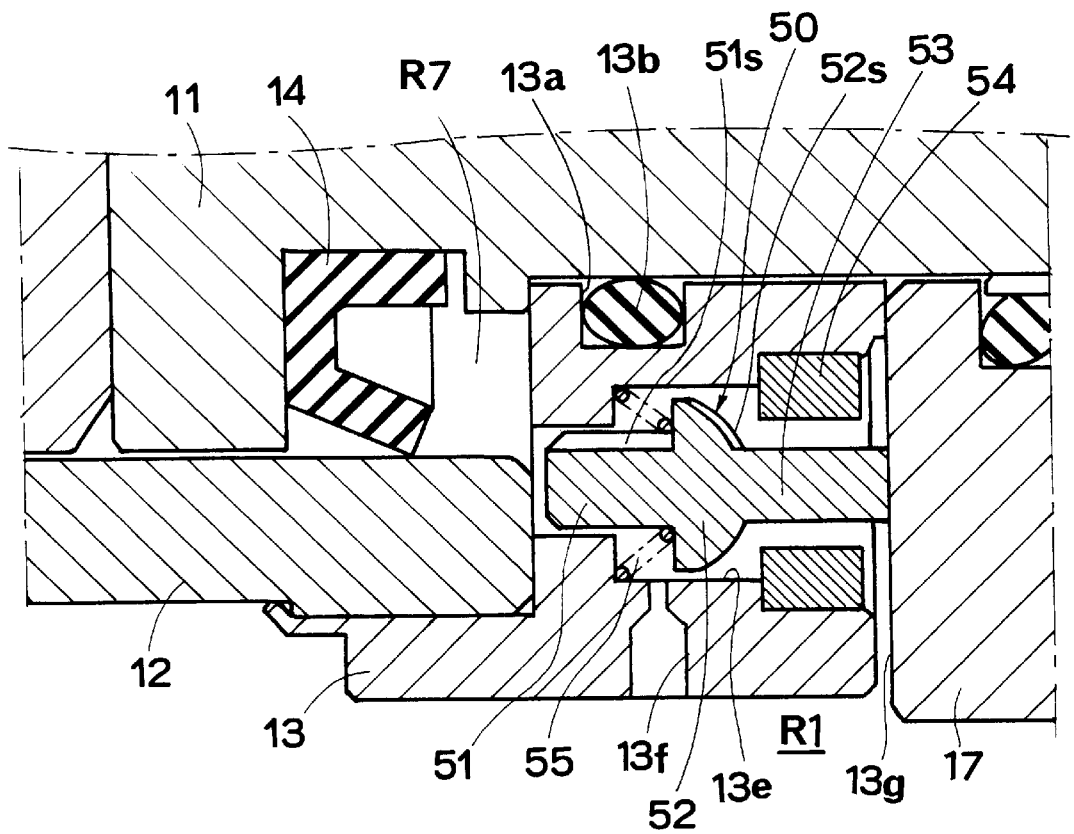
FIG. 4 is a sectional view of a part of a brake pressure control apparatus for a vehicle according to a further embodiment of the present invention.

FIG. 4 illustrates a part of an embodiment having the first variable throttle means according to the present invention, wherein a stepped bore 13e is formed in lieu of the throttle passage 13d as shown in FIG. 2, and a valve member 50 is received in the stepped bore 13e. The valve member 50 has a shaft portion 51 which is received in a small diameter portion of the stepped bore 13e, a valve member 52 connected to the shaft portion 51, and a shaft portion 53 connected to the valve member 52. A slit 51s is formed on the shaft portion 51, and a slit 52s is formed on the valve member 52. An annular valve seat 54 is fixed to a large diameter portion of the stepped bore 13e. In the holding member 13 is formed a throttle passage 13f, through which the inside of the stepped bore 13e is communicated with the power chamber R1. In FIG. 4, the second piston 12 and the holding member 13 are placed at their rearmost positions, where a clearance 13g is defined between the holding member 13 and the sleeve 17, and where the valve member 50 is urged by a spring 55 to hold the shaft portion 53 in abutment with the sleeve 17. Accordingly, the power chamber R1 is communicated with the closed space R7 through the throttle passage 13f and the clearance 13g with a sufficient flow passage area.

When the power pressure is supplied into the power chamber R1, the second piston 12 and the holding member 13 will be moved forward, so that the valve member 52 will be urged by the spring 55 to be seated onto the valve seat 54. As a result, the power chamber R1 will be communicated with the closed space R7 through only the throttle passage 13f and the small slit 52s, the flow passage area will be restricted to be the smallest, thereby to ensure the damping effect.

Whereas, in such a case where no power pressure exists in the power chamber R1, if the brake pedal 2 is depressed rapidly, the pistons 11x, 11y reach their foremost positions, while the second piston 12 stays at its initial position, so that the volume of the closed space R7 will be increased. In this condition, if the brake pedal 2 is released, the pistons 11x, 11y are moved so as to reduce the volume of the closed space R7. In this case, however, according to the embodiment as shown in FIG. 2, the brake fluid in the closed space R7 is discharged to the power chamber R1 only through the throttle passage 13d, it may take so much time to drain the brake fluid that the release action may be delayed. On the contrary, according to the present embodiment, the second piston 12 and the holding member 13 are in abutment with the sleeve 17, holding the clearance 13g, the valve seat 54 will not move from the position as shown in FIG. 4 thereby to hold the valve member 52 away from the valve seat 54. Thus, the power chamber R1 is communicated with the closed space R7 through not only the though passage 13f, but also the clearance between the valve member 52 and the valve seat 54, and the clearance 13g, so that the sufficient flow passage area is obtained. Consequently, the pistons 11x, 11y will be returned to their initial positions smoothly, so that the returning movement of the brake pedal 2 can be made smooth.

Figure 5:
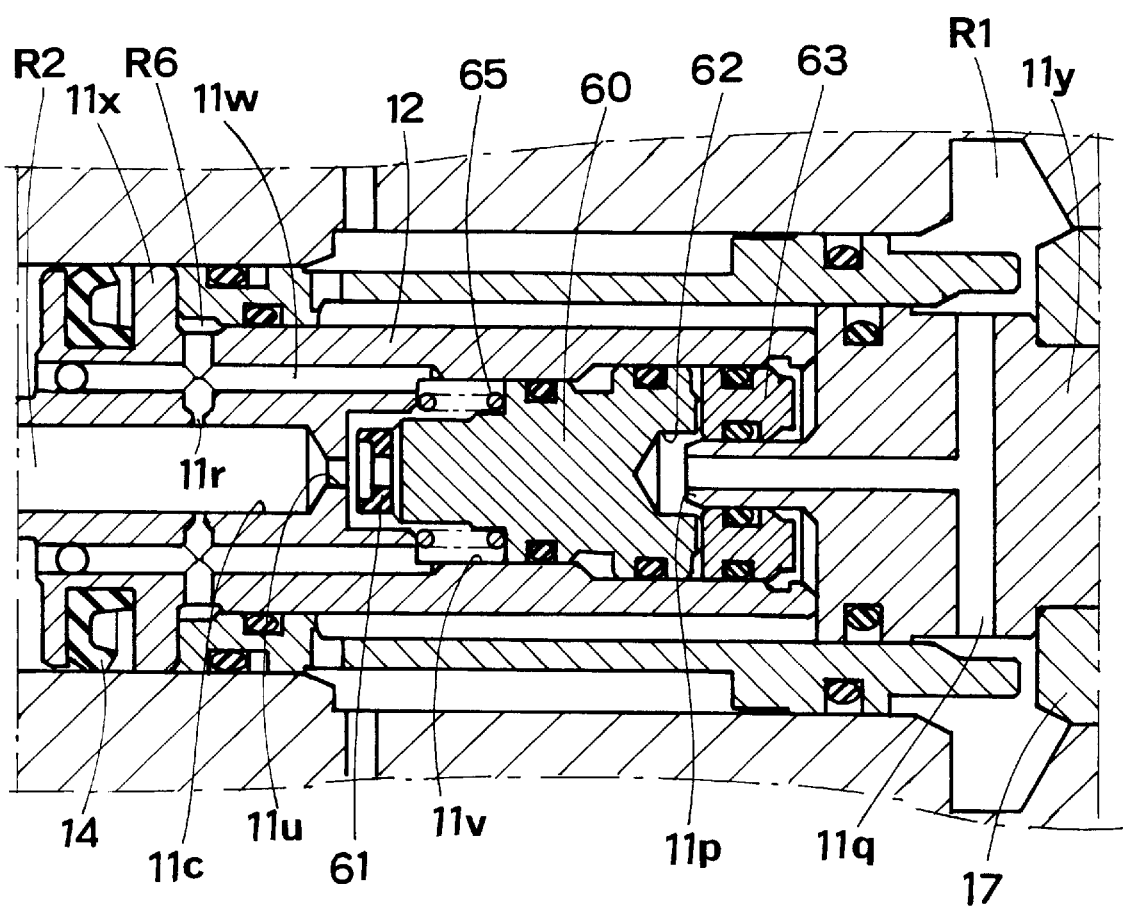
FIG. 5 is a sectional view of a part of a brake pressure control apparatus for a vehicle according to a yet further embodiment of the present invention.

FIG. 5 illustrates a part of an embodiment having the second variable throttle means according to the present invention, wherein the throttle area is varied in response to a difference in pressure between the pressure chamber R2 and the power chamber R1. At the rear end of the piston 11x, a stepped bore 11v is formed to communicate with the recess 11c through a throttle passage 11u. Also, a passage 11w is formed in the piston 11x to communicate the closed space R6 with the recess 11c through a throttle passage 11r. In the stepped bore 11v, a valve member 60 is fluid-tightly and slidably received, with a resilient valve 61 mounted on its front end, and with a recess 62 formed at its rear end. Behind the valve member 60, an annular sleeve 63 is fitted into the stepped bore 11v, and a spring 65 is mounted in the stepped bore 11v to urge the valve member 60 to abut on the sleeve 63. The piston 11y has at its tip end a protrusion 11p which is fitted into the inside of the sleeve 63, and a passage 11q which communicates the power chamber R1 with a space defined between the valve member 60 and the sleeve 63 in front of the protrusion 11p.

According to the embodiment as shown in FIG. 5, therefore, when the power pressure does not exist in the pressure chamber R1, the closed space R6 is communicated with the recess 11c through the passage 11u and the throttle passage 11r with a sufficient flow passage area. Consequently, the returning movement of the brake pedal 2 can be made smooth. On the contrary, when the power pressure is supplied into the power chamber R1, the valve member 60 is moved forward in response to a difference in pressure between the power chamber R1 and the pressure chamber R2, so that the passage 11u is closed by the valve 61 of the valve member 60. As a result, the closed space R6 is communicated with the recess 11c through only the throttle passage 11r, so that the flow passage area is restricted thereby to ensure the damping effect.

It should be apparent to one skilled in the art that the above-described embodiments are merely illustrative of but a few of the many possible specific embodiment of the present invention. Numerous and various other arrangements can be readily devised by those skilled in the art without departing from the spirit and scope of the invention as defined in the following claims.

What is claimed is:

1. A hydraulic brake apparatus for a vehicle comprising:
   a master cylinder having a cylinder body and a master piston slidably disposed therein for defining a pressure chamber ahead of said master piston and a power chamber behind said master piston, said master piston being moved forward in response to operation of a manually operated member to generate a brake pressure from said pressure chamber, and said master piston including a first piston connected to a manually operated member and a second piston slidably disposed relative to said first piston, the rear ends of said first piston and second piston being exposed to said power chamber, and the front ends of said first piston and second piston being exposed to said pressure chamber;

an engaging member for engaging said second piston with said first piston upon forward movement of said second piston;

a control piston slidably disposed in said cylinder body ahead of said master piston for defining said pressure chamber behind said control piston, said control piston being moved in response to movement of said master piston;

an auxiliary pressure source for pressurizing brake fluid to generate a power pressure; and valve means communicated with said auxiliary pressure source for regulating the power pressure into a regulated pressure in response to movement of said control piston, said valve means supplying the regulated pressure into said power chamber to assist the operation of said manually operated member.

2. A hydraulic brake apparatus for a vehicle as recited in claim 1, wherein said engaging member includes a shoulder portion which is formed on said first piston, and which is adapted to abut on said second piston upon forward movement of said second piston.

3. A hydraulic brake apparatus for a vehicle as recited in claim 1, wherein said second piston is formed with a cylindrical member with the rear end thereof exposed to said power chamber and with the front end thereof exposed to said pressure chamber, wherein said first piston is slidably received in said cylindrical member with a closed space defined between said first piston and said cylindrical member, and wherein a passage is provided for communicating said closed space with said pressure chamber.

4. A hydraulic brake apparatus for a vehicle as recited in claim 3, wherein throttle means is disposed in said passage for restricting a flow passage area of said passage.

5. A hydraulic brake apparatus for a vehicle as recited in claim 3, wherein variable throttle means is disposed in said passage for varying a flow passage area of said passage in response to the pressure in said power chamber.

6. A hydraulic brake apparatus for a vehicle as recited in claim 5, wherein said variable throttle means is first means for varying the flow passage area of said passage in response to a position of said second piston.

7. A hydraulic brake apparatus for a vehicle as recited in claim 5, wherein said variable throttle means is second means for varying the flow passage area of said passage in response to a difference in pressure between said pressure chamber and said power chamber.

8. A hydraulic brake apparatus for a vehicle as recited in claim 1, wherein said second piston is formed with a cylindrical member with the rear end thereof exposed to said power chamber and with the front end thereof exposed to said pressure chamber, wherein said first piston is slidably received in said cylindrical member with a closed space defined between said first piston and said cylindrical member, and wherein a passage is provided for communicating said closed space with said power chamber.

9. A hydraulic brake apparatus for a vehicle as recited in claim 8, wherein throttle means is disposed in said passage for restricting a flow passage area of said passage.

10. A hydraulic brake apparatus for a vehicle as recited in claim 8, wherein variable throttle means is disposed in said passage for varying a flow passage area of said passage in response to the pressure in said power chamber.

11. A hydraulic brake apparatus for a vehicle as recited in claim 10, wherein said variable throttle means is first means for varying the flow passage area of said passage in response to a position of said second piston.

12. A hydraulic brake apparatus for a vehicle as recited in claim 10, wherein said variable throttle means is second means for varying the flow passage area of said passage in response to a difference in pressure between said pressure chamber and said power chamber.

13. A hydraulic brake apparatus for a vehicle as recited in claim 1, wherein said valve means comprises:

a spool engaged with a front end of said control piston within said regulator chamber; and a sleeve disposed in said cylinder body for slidably receiving therein said sleeve, said spool being moved relative to said sleeve in response to movement of said control piston to introduce the power pressure from said auxiliary pressure source into said regulator chamber and generate the regulated pressure therefrom.

* * * * *